Feb. 6, 1934. J. WACHSMAN Re. 19,069
STOP MECHANISM FOR KNITTING MACHINES
Original Filed Nov. 3, 1930
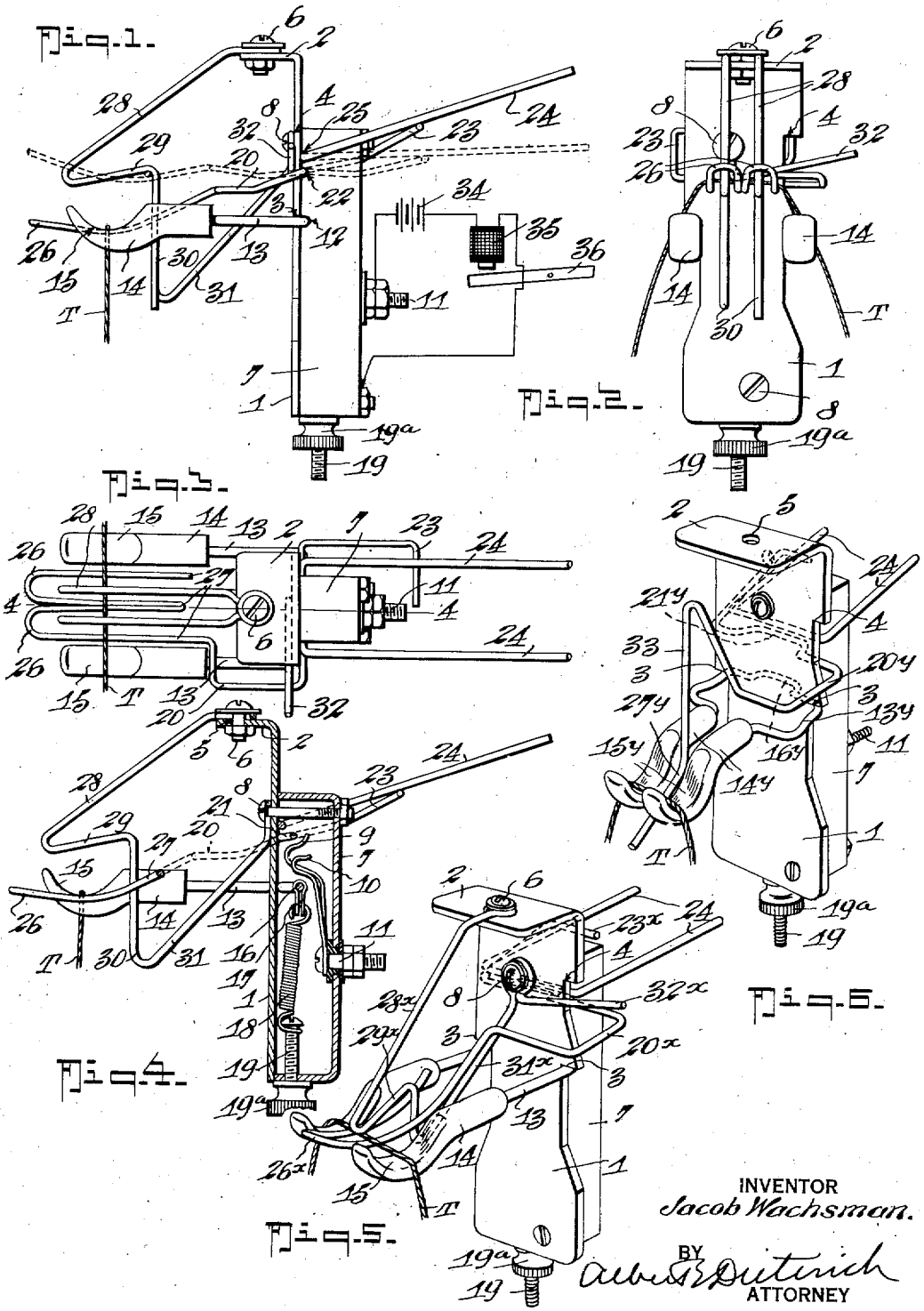
INVENTOR
Jacob Wachsman.
BY
Albert R. Dieterich
ATTORNEY Reissued Feb. 6, 1934 Re. 19,069

UNITED STATES PATENT OFFICE 19,069

STOP MECHANISM FOR KNITTING MACHINES

Jacob Wachsman, Brooklyn, N. Y.

Original No. 1,835,732, dated December 8, 1931, Serial No. 493,179, November 3, 1930. Application for reissue November 9, 1933. Serial No. 697,999

10 Claims. (Cl. 66—163)

My invention relates to electric stop mechanisms for knitting machines of the general type in which the stop mechanism is included in an electric stop circuit and is provided with a plurality of yarn supporting levers so arranged that during the normal operation of the knitting machine, the yarn keeps said levers in a circuit open position, but when a knot occurs in the yarn one of said levers is moved to a circuit closing position and when the yarn breaks, the other of said levers is moved to close the circuit. The closing of the circuit in either event operates to stop the machine.

One object of my invention is to provide an electric stop mechanism which shall be of compact sturdy construction, efficient in operation and economic to manufacture.

Another object is to provide a construction which admits of modifications and changes to suit the particular place and type of knitting machine with which the stop mechanism is to be used, but without necessitating fundamental changes in the general construction.

Again, it is an object to provide a gravity actuated lever which will tend to lift the thread off the surface of the spring-held lever arms, thereby to reduce the area of contact between the thread and these parts, instead of having the gravity actuated lever press the thread down on the surface of the spring-held lever arms as in prior structures.

Further, it is an object to provide against the accidental closing of the circuit by a mere slacking of the thread.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a side elevation of one embodiment of my invention which has been especially designed for use with fine thread, the electric circuit of the stop motion mechanism being diagrammatically indicated.

Figure 2 is a front elevation of the device shown in Figure 1.

Figure 3 is a plan of the same.

Figure 4 is a vertical longitudinal section on the line 4—4 of Figure 3.

Figure 5 is a perspective view of another embodiment which has been especially designed for use with medium weight thread.

Figure 6 is a perspective view of a further embodiment which has been especially designed for use with a heavy thread. It is obvious however, that the statements as to the use of the different embodiments of the invention are not intended to be a distinct classification with respect thereto.

In the drawing I provide a housing consisting of a supporting plate 1 having a bent over end 2 for mounting and provided with shoulders 3 to constitute stops for limiting the movement of the spring-held lever 13 hereinafter referred to. The plate 1 is also provided with a cut-away portion 4 while the bent over or mounting portion 2 of the plate is provided with a hole 5 for the reception of a screw or bolt 6 by means of which the device may be mounted on a suitable supporting part of the knitting machine.

The housing also includes a box 7 whose front is closed by the plate 1 and which is secured to that plate by screws or bolts 8. Mounted within the box 7 is a long contact spring 9 and a short contact spring 10 secured to a suitable terminal bolt 11 that is mounted on, but insulated from, the box 7.

Bearing notches 12 are provided in the side walls of the box 7 for the spring-held lever 13 whose parallel arms embrace the plate 1 and extend forwardly thereof, terminating in porcelain fingers 14 having concave portions 15 to hold the thread T. The spring-held lever where it passes through the box 7 is provided with a heel 16 for effecting contact with the springs 10 and 9 when the lever 13 is pulled down against the tension of the hold-back spring 18 as will later be explained. The spring 18 has one end hooked into a stirrup 17 that is carried by the heel 16 and it has its other end anchored to a screw 19 which carries an adjusting nut 19*a* whereby the tension of the spring may be regulated.

20 designates a gravity actuated lever which is mounted in suitable bearing notches 22 in the side walls of the box 7 and which has a loop portion or heel 21 to engage the contact spring 9 when the lever 20 is raised beyond a certain limit as will later be more fully explained.

The lever 20 has a rearwardly extending portion 23 bent over to underlie a pivoted weight-lever 24 which is also mounted in suitable bearing notches 25 in the side walls of the box 7 and which has for its purpose to over-balance the lever 20 and continuously tend to elevate it to a position higher than that indicated in dotted lines in Figure 1, whereby when so elevated to the highest position the heel 21 of the lever 20 will engage the contact spring 9 and close the electric circuit.

The lever 20 in the first embodiment of my invention has its front end bent into approximately the shape of the letter M thus providing two loops 26 with three parallel rods 27 which lie between the porcelain fingers 14 of the spring-held lever 13 when the thread T is in position, see Figure 1.

28 is the downwardly and forwardly inclined portion of a guard member formed of wire and secured at 6 to the bent over end 2 of the plate 1, the guard member also including rearwardly extending approximately horizontal portions 29 which merge with vertical back stop portions 30, from one of which there is an upwardly and rearwardly extending portion 31 that is anchored at 8 to the plate 1, see Figures 1, 2 and 3. The construction of the guard is such that when the gravity actuated lever 20 is free to rise the portions 29—28 of the guard will pass within the loops 26 between the parallel portions 27, it being understood that the vertical portions 30 continuously lie projected through the loops 26 and between the fingers 14, see Figures 1 and 2.

The portion 31 of the guard which is anchored at 8 is continued laterally as an extension 32 to constitute a stop for limiting the upward movement of the gravity actuated lever 20. By bending the projection 32 up or down (see Figure 2) the height to which the lever 20 may be permitted to rise before engaging the stop 32 may be correspondingly varied.

In the embodiment of my invention shown in Figure 6, those parts which are of the same construction as shown in Figure 1 bear the same reference numerals. Those parts which correspond in construction and function but are different in form from the parts shown in Figure 1 bear the same reference numerals plus the index letter *y*. In this embodiment (Figure 6) the back stop 33 is formed as a part of the gravity actuated lever 20*y* instead of as a part of the guard as in Figure 1.

In the embodiment shown in Figure 5 those parts which are of the same construction as corresponding parts in Figure 1 bear the same reference numerals and those parts which are of similar construction and perform the same function as corresponding parts in Figure 1, but differ therefrom in form, bear the same reference numerals plus the index character *x*. In the embodiment of Figure 5 it will be observed that the guard is a single guard and the gravity actuated lever has but a single loop 26*x* instead of the double guard and loop structure shown in Figure 1.

The electric stop mechanism which is controlled by my circuit closer may be of the ordinary construction, and as it per se forms no part of the present invention, it has been merely diagrammatically indicated in Figure 1, by reference to which it will be observed that 34 is the battery and 35 the magnet which actuates the stop motion actuating lever 36 to stop the machine when the magnet is energized.

In the use of my invention the device is mounted at a suitable location on the knitting machine and the thread is laid over the two levers 20 and 13 so as to lie in the concavity of fingers 14 as best shown in Figures 1, 2, 4 and 5 of the drawing.

When the thread is running through the machine it is under sufficient tension to hold the gravity actuated lever in substantially the positions indicated in Figures 1, 4, 5 and 6. The gravity actuated lever being overbalanced by the weight-lever 24, continuously tends to raise the threads so as to reduce its frictional contact area with the fingers 14 tending to assume the position shown in Figure 2 but normally not quite reaching that position. When, however, the thread slacks then the position shown in Figure 2 and in dotted lines in Figure 1 will be reached, but the electric circuit will not be closed in the box 7 because the guard 28 overlies the thread T and prevents the gravity actuated lever from raising to its circuit closed position. However, as soon as the end of the thread passes the guard the lever 20 will rise and close the circuit, thus stopping the movement of the knitting machine. Furthermore, if undue tension is put upon the thread as for example if a knot causing a stoppage of the movement of the thread before it reaches the circuit closer, the thread will pull down the levers 20 and 13 and slip off of the same, thereby at once releasing both the levers 13 and 20 and permitting them to close the electric circuit. The arrangement is preferably such that as the lever 13 is pulled down to a position about to release the thread, its heel 16 will make electrical connection with the spring 10 and at once close the circuit to the stop mechanism.

The back stops 30, 30*x* and 33 serve to prevent the thread from working back over the fingers 14 and getting into a position where the thread will tend to bind or meet with undue friction.

It will however be apparent that the efficient operation of the two levers with respect to closing the circuit is not dependent upon the presence of the overhanging guard or the back stop which are simply additional devices for the sake of precaution. When a knot occurs on the thread, the spring lever will be pulled down to close the circuit and when the thread breaks or runs out the gravity operated lever will be swung upward and also close the circuit and this will happen irrespective of the guard or back stop.

From the foregoing description, taken in connection with the accompanying drawing, it is thought the complete construction, operation and advantages of my invention will be clear to those skilled in the art to which it relates.

What I claim is:

1. In stop mechanism under control of a travelling thread, a circuit closer unit comprising a housing, a fixed contact member insulated from and mounted in said housing, a circuit terminal therefor, a spring-held lever fulcrumed in said housing and including two substantially parallel arms extending to the outside of said housing, and having a contact heel to engage said contact member when said arms are pulled down, a gravity actuated lever also fulcrumed in said housing and having a contact heel to engage said contact member when said gravity actuated lever is moved upwardly beyond a predetermined position, said gravity actuated lever having its fore end positioned to be held between said parallel arms by the thread placed thereover, and overbalancing means continuously tending to move said gravity actuated lever to bring its fore end above said arms and move it to a circuit closing position.

2. In stop mechanism under control of a travelling thread, a circuit closer unit comprising a housing, a fixed contact member insulated from and mounted in said housing, a circuit terminal therefor, a spring-held lever fulcrumed in said housing and including two substantially parallel arms extending to the outside of said housing, and having a contact heel to engage said contact member when said arms are pulled down, a gravity actuated lever also fulcrumed in said housing and having a contact heel to engage said contact member when said gravity actuated lever is moved upwardly beyond a predetermined position, said gravity actuated lever having its fore end positioned to be held between said parallel arms by the thread placed thereover, and overbalancing means continuously tending to move said gravity actuated lever to bring its fore end above said arms and move it to a circuit closing position, and a guard member mounted on said housing to hold said gravity actuated lever against closing the circuit so long as a thread lies over the fore end of said lever.

3. In stop mechanism under control of a travelling thread, a circuit closer unit comprising a housing, a fixed contact member insulated from and mounted in said housing, a circuit terminal therefor, a spring-held lever fulcrumed in said housing and including two substantially parallel arms extending to the outside of said housing, and having a contact heel to engage said contact member when said arms are pulled down, a gravity actuated lever also fulcrumed in said housing and having a contact heel to engage said contact member when said gravity actuated lever is moved upwardly beyond a predetermined position, said gravity actuated lever having its fore end positioned to be held between said parallel arms by the thread placed thereover, and overbalancing means continuously tending to move said gravity actuated lever to bring its fore end above said arms and move it to a circuit closing position, and a vertical back stop located between said arms.

4. In stop mechanism under control of a travelling thread, a circuit closer unit comprising a housing, a fixed contact member insulated from and mounted in said housing, a circuit terminal therefor, a spring-held lever fulcrumed in said housing and including two substantially parallel arms extending to the outside of said housing, and having a contact heel to engage said contact member when said arms are pulled down, a gravity actuated lever also fulcrumed in said housing and having a contact heel to engage said contact member when said gravity actuated lever is moved upwardly beyond a predetermined position, said gravity actuated lever having its fore end positioned to be held between said parallel arms by the thread placed thereover, and overbalancing means continuously tending to move said gravity actuated lever to bring its fore end above said arms and move it to a circuit closing position, and a guard member mounted on said housing to hold said gravity actuated lever against closing the circuit so long as a thread lies over the fore end of said lever, said guard member also including an upright back stop located between said arms.

5. In stop mechanism under control of a travelling thread, a circuit closer unit comprising a housing, a fixed contact member insulated from and mounted in said housing, a circuit terminal therefor, a spring-held lever fulcrumed in said housing and including two substantially parallel arms extending to the outside of said housing, and having a contact heel to engage said contact member when said arms are pulled down, a gravity actuated lever also fulcrumed in said housing and having a contact heel to engage said contact member when said gravity actuated lever is moved upwardly beyond a predetermined position, said gravity actuated lever having its fore end positioned to be held between said parallel arms by the thread placed thereover, and overbalancing means continuously tending to move said gravity actuated lever to bring its fore end above said arms and move it to a circuit closing position, said overbalancing means comprising a pivoted member mounted on said housing and a finger on said gravity actuated lever to underlie said pivoted member.

6. In stop mechanism under control of a travelling thread, a circuit closer unit comprising a housing, a fixed contact member insulated from and mounted in said housing, a circuit terminal therefor, a spring-held lever fulcrumed in said housing and including two substantially parallel arms extending to the outside of said housing, and having a contact heel to engage said contact member when said arms are pulled down, a gravity actuated lever also fulcrumed in said housing and having a contact heel to engage said contact member when said gravity actuated lever is moved upwardly beyond a predetermined position, said gravity actuated lever having its fore end positioned to be held between said parallel arms by the thread placed thereover, and overbalancing means continuously tending to move said gravity actuated lever to bring its fore end above said arms and move it to a circuit closing position, and a guard member including a projection serving as a stop to limit the upward movement of said gravity actuated lever.

7. In stop mechanism under control of a travelling thread, a circuit closer unit comprising a housing, a fixed contact member insulated from and mounted in said housing, a circuit terminal therefor, a spring-held lever fulcrumed in said housing and including two substantially parallel arms extending to the outside of said housing, and having a contact heel to engage said contact member when said arms are pulled down, a gravity actuated lever also fulcrumed in said housing and having a contact heel to engage said contact member when said gravity actuated lever is moved upwardly beyond a predetermined position, said gravity actuated lever having its fore end positioned to be held between said parallel arms by the thread placed thereover, and overbalancing means continuously tending to move said gravity actuated lever to bring its fore end above said arms and move it to a circuit closing position, and a guard member mounted on said housing to hold said gravity actuated lever against closing the circuit so long as a thread lies over the fore end of said lever, said gravity actuated lever having its fore part formed with a plurality of parallel portions adapted to be caused to lie between said arms when a thread is in place, and said guard comprising portions to lie between each pair of said plurality of parallel portions, said guard member including a projection serving as a stop to limit the upward movement of said gravity actuated lever.

8. In stop mechanism under control of a travelling thread, a circuit closer unit comprising a housing, a fixed contact member insulated from and secured in said housing, a circuit terminal therefor, a spring-held lever fulcrumed in said housing and including a thread receiving portion extending to the outside of said housing and having a contact heel to engage said contact member when said lever is pulled down by the thread, a gravity actuated lever also fulcrumed in said housing and having a contact heel to engage said contact member when said gravity actuated lever is moved upwardly beyond a predetermined position when the thread breaks, said gravity actuated lever having its fore end positioned underneath and in contact with the thread adjacent to the aforesaid thread receiving portion.

9. In stop mechanism under control of a travelling thread, a circuit closer unit comprising a housing, a fixed contact member insulated from and secured in said housing, a circuit terminal therefor, a spring-held lever fulcrumed in said housing and including a thread receiving portion extending to the outside of said housing and having a contact heel to engage said contact member when said lever is pulled down, a gravity actuated lever also fulcrumed in said housing and having a contact heel to engage said contact member when said gravity actuated lever is moved upwardly beyond a predetermined position, said gravity actuated lever having its fore end positioned to be held in a circuit open position underneath the thread adjacent to said portion by the thread placed on the latter and overbalancing means continuously tending to move said gravity actuated lever to bring its fore end above the said spring-held lever and move it to a circuit closing position.

10. In a stop mechanism under control of a travelling thread, a circuit closer unit comprising a housing, a fixed contact member in said housing, a lever pivoted in the housing and having a thread receiving substantially straight portion extending away from the housing underneath and across the path of the travelling thread normally placed thereon, a spring for normally maintaining said lever with its thread receiving portion in a substantially horizontal position in engagement with the thread, a contact heel on said lever to engage said contact member when said thread receiving portion is pulled down a slight distance below its normal position, a gravity actuated lever also pivoted in said housing and having a substantially straight thread engaging fore end portion extending away from the housing underneath and across the path of the travelling thread adjacent to said thread receiving portion, a contact heel on said gravity actuated lever to engage said fixed contact member and overbalancing means for operating said gravity actuated lever to a circuit closing position when the thread no longer is present on said thread receiving portion.

JACOB WACHSMAN.